US010133842B1

(12) United States Patent
Kulshreshtha et al.

(10) Patent No.: US 10,133,842 B1
(45) Date of Patent: Nov. 20, 2018

(54) METHODS, SYSTEMS, AND ARTICLES OF MANUFACTURE FOR MULTI-MODE, MULTI-CORNER PHYSICAL OPTIMIZATION OF ELECTRONIC DESIGNS

(71) Applicant: Cadence Design Systems, Inc., San Jose, CA (US)

(72) Inventors: Pawan Kulshreshtha, San Jose, CA (US); Amit Dhuria, Cupertino, CA (US); Krishna Prasad Belkhale, Saratoga, CA (US); Saulius Kersulis, Pleasanton, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 262 days.

(21) Appl. No.: 15/133,665

(22) Filed: Apr. 20, 2016

(51) Int. Cl.
*G06F 17/50* (2006.01)

(52) U.S. Cl.
CPC ...... *G06F 17/5081* (2013.01); *G06F 17/5031* (2013.01); *G06F 2217/84* (2013.01)

(58) Field of Classification Search
CPC ............. G06F 17/5031; G06F 17/5081; G06F 2217/84
USPC .................................................. 716/108, 113
See application file for complete search history.

(56) References Cited

U.S. PATENT DOCUMENTS 8,875,082 B1 * 10/2014 Sircar ................. G06F 17/5031
716/110

OTHER PUBLICATIONS

Palla, Murthy, et al. "Timing arc based logic analysis for false noise reduction." Proceedings of the 2009 International Conference on Computer-Aided Design. ACM, 2009.
Salman, Emre, et al. "Exploiting setup—hold-time interdependence in static timing analysis." IEEE Transactions on Computer-Aided Design of Integrated Circuits and Systems 26.6 (2007): 1114-1125.
Kahng, Andrew B., et al. VLSI physical design: from graph partitioning to timing closure. Chapter 8: Timing Closure. Springer Science & Business Media, 2011.
Mallika Prakash, "Library Characterization and Static Timing Analysis of Asynchronous Circuits", Faculty of the USC Viterbi School of Engineering Univeristy of Southern California, Dec. 2007.

* cited by examiner

*Primary Examiner* — Paul Dinh
(74) *Attorney, Agent, or Firm* — Vista IP Law Group, LLP (57) ABSTRACT

Disclosed are techniques for multi-mode, multi-corner physical optimization of electronic designs. These techniques identify an electronic design and a global set of views. Timing information is characterized with the global set of views for the electronic design. A set of active views is generated at least by pruning one or more views from the global set of views for a first node in the electronic design while maintaining the one or more views for a second node in the set of active views. The electronic design is then associated with the set of active views that is stored in a data structure in a non-transitory computer accessible storage medium.

22 Claims, 9 Drawing Sheets

METHODS, SYSTEMS, AND ARTICLES OF MANUFACTURE FOR MULTI-MODE, MULTI-CORNER PHYSICAL OPTIMIZATION OF ELECTRONIC DESIGNS

BACKGROUND

Physical optimizations and corrections techniques such as the post-place optimization, post-route optimization, etc. have been broadly used to achieve timing closure where electronic designs are checked or modified, if necessary, to meet timing requirements. The ever increasing complexity of modern electronic designs (e.g., system on chip or SoC) due to more transistors, more functionality, multiple modes, and multiple corners nevertheless requires longer runtime and larger memory footprint to achieve timing closure. These physical optimization and corrections populate timing data for an electronic design and utilize physics based techniques and a set of views to analyze whether an electronic design meets the timing requirements. A modern electronic design often involves multiple modes and multiple corners, the combination of which thus produces more views for physical optimization to consider and further acerbates the runtime required to achieve timing closure.

Recent development in physical optimizations and corrections attempt to reduce the number of views for timing closure by leveraging global pruning techniques to disable or eliminate views globally so as to reduce the total number of views. Although global pruning does reduce the total number of views somewhat, these conventional approaches are nevertheless not satisfactory because of their conservatism in pruning views across the entire electronic design. For example, a particular view may not be needed for all but one or a few gates in physical optimizations of an electronic design. The global pruning techniques will not remove this particular view simply because this particular view is needed for the only one or a few gates in physical optimizations or corrections.

Therefore, there exists a need for a method, system, and computer program product for multi-mode, multi-corner physical optimization of electronic designs in a more efficient and less computational resource consuming manner.

SUMMARY

Disclosed are method(s), system(s), and article(s) of manufacture for multi-mode, multi-corner physical optimization of electronic designs in various embodiments. Some first embodiments are directed at a method for multi-mode, multi-corner physical optimization of electronic designs. In these embodiments, an electronic design and a global set of views that is generated in response to multiple modes and multiple corners are identified. Timing information is characterized with the global set of views for the electronic design. A set of active views is generated at least by pruning one or more views from the global set of views for a first node in the electronic design while maintaining the one or more views for a second node in the set of active views. The electronic design is then associated with the set of active views that is stored in a data structure in a non-transitory computer accessible storage medium.

Some embodiments are directed at an article of manufacture that includes a non-transitory machine-accessible storage medium having stored thereupon a sequence of instructions which, when executed by at least one micro-processor or at least one processor core, causes the at least one micro-processor or the at least one processor core to perform any of the methods, processes, or sub-processes disclosed herein. Some illustrative forms of the non-transitory machine-readable storage media may also be found in the System Architecture Overview section below.

More details of various aspects of the methods, systems, or articles of manufacture for multi-mode, multi-corner physical optimization of electronic designs are described below with reference to FIGS. 1-5.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments are directed to a method, system, and computer program product for multi-mode, multi-corner physical optimization of electronic designs. Other objects, features, and advantages of the invention are described in the detailed description, figures, and claims.

In various embodiments, delay calculation is performed to characterize the gate delays and interconnect delays. A timing analysis is performed with a set of global views encompassing multiple modes and multiple corners to obtain the timing information for an electronic design of interest or a portion thereof. The timing information may be associated with or annotated in a representation of the electronic design such as a timing graph. This global set of views may be optionally pruned by utilizing global pruning techniques to generate a globally pruned set of views by disabling or discarding one or more views across the entire electronic design of interest.

Begin and end point pruning techniques may be applied to the electronic design to selectively and locally, rather than globally, prune views from the global set of views to generate a set of active views while accommodating the multiple modes and multiple corners. These techniques identify relevant views at the begin points and end points of an electronic design. These relevant views may include, for example, violating views, worst views, etc. At least some of these relevant views are then propagated in a forward or backward direction at various nodes of interest along the respective nets in the electronic design to identify propagated views that may also be needed for physical optimizations or corrections. These relevant views and propagated views are identified as a set of active views for physical optimizations or corrections, whereas the remaining views in the original global set of views may be ignored.

During physical optimizations or corrections, timing data corresponding to these relevant views and the propagated views may be populated, while the remaining views may be ignored so that timing data corresponding to the remaining views will not be populated. As a result, only timing data associated with the set of active views, instead of the global set of views or the globally pruned set of views, will be populated in some embodiments. Because this set of active views represents a smaller subset of the globally pruned set of views and hence the global set of views, physical optimization modules may thus achieve timing closure with higher efficiencies by consuming shorter runtime and smaller memory footprint. The local and selective pruning of views from a global set of views thus avoids the pessimism and conservatism of conventional global pruning techniques.

Various embodiments of the methods, systems, and articles of manufacture will now be described in detail with reference to the drawings, which are provided as illustrative examples of the invention so as to enable those skilled in the art to practice the invention. Notably, the figures and the examples below are not meant to limit the scope of various embodiments, unless otherwise specifically described in particular embodiment(s) or recited in the claim(s).

Where certain elements of embodiments may be partially or fully implemented using known components (or methods or processes), portions of such known components (or methods or processes) that are necessary for an understanding of the present invention will be described, and the detailed descriptions of other portions of such known components (or methods or processes) will be omitted for ease of explanation and to not obscure embodiments of the invention. Further, embodiments encompass present and future known equivalents to the components referred to herein by way of illustration. More details about various processes or modules to implement various embodiments are further described below with reference to FIGS. 1-5.

Figure 1:
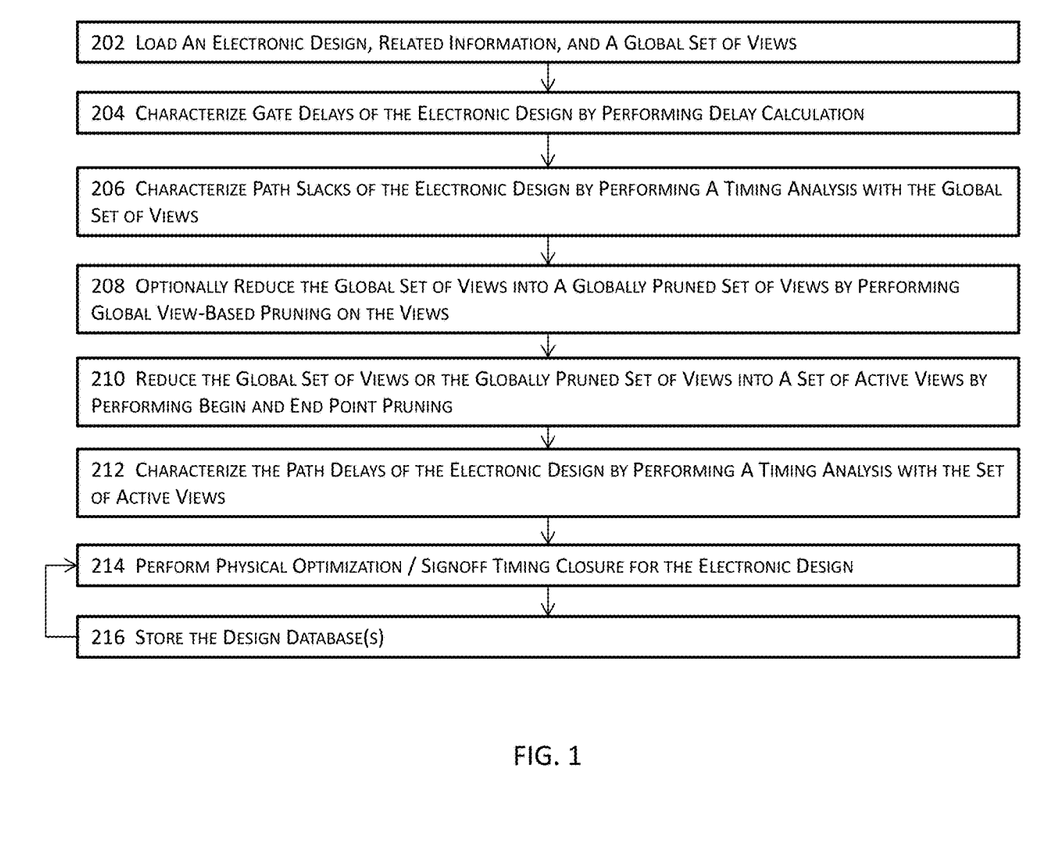
FIG. 1 illustrates a block diagram for multi-mode, multi-corner physical optimization of electronic designs in one or more embodiments.

FIG. 1 illustrates a block diagram for multi-mode, multi-corner physical optimization of electronic designs in one or more embodiments. An electronic design together with other related files or data may be first loaded at 202 onto a computing system that invokes various modules such as those in 152 of FIG. 2 to perform various operations for physical optimization of the electronic design. The electronic design may include a physical design such as a post-placement or a post-route layout and may be represented in various representations including, for example, a timing graph that represents the logic and circuit structure of the electronic design. The related files or data may further include a global set of views that may be used in subsequent physical optimizations.

A view may be generated using various pieces of data that include, for example, design or timing constraints, modes, corners, library files, electrical characteristics (voltages, currents, etc.), operating conditions (e.g., temperatures, etc.), RC reduction information, or any other information that is required or desired for successful physical optimizations. A view is thus associated with its own set of data. Each pin, port, or terminal in an electronic design may thus be associated with one or more views. During physical optimizations, the corresponding one or more sets of data need to be loaded for a pin. One of the advantages of these techniques described herein is the actual reduction of the total number of views and hence the total number of sets of data to be loaded for a more efficient and accurate physical optimization of an electronic design, while conserving computational resources and accommodating all the corners and modes.

Gate delays of the electronic design may be determined at 204 by performing delay calculations or by looking up existing gate delay information. The gate delays and interconnect delays determined at 204 may be further utilized in a timing analysis at 206 to characterize timing information at a plurality of pins, ports, or combinations thereof in the electronic design. In some embodiments where the electronic design is a post-placement layout with partial or even no topological routing information, the requisite information such as the resistance values, the capacitance values, topology of the net, etc. for the portion having no topological routing information may be estimated using connectivity information, global routing information, and the positions of the pins, ports, terminals, etc. available in the post-placement layout for the timing analysis. For example, the requisite information may be estimated with the Manhattan distances or the differences between two connected pins from the connectivity information.

The timing analysis may be performed at 206 with the global set of views that has not been reduced by various techniques described below. The results of this timing analysis at 206 include various pieces of timing data for the electronic design such as the slack values associated with each connection in the electronic design. A slack at a connection is the difference between the arrival time and the required time of a signal at the connection. A positive slack value thus indicates that the signal arrives earlier than required. On the other hand, a negative slave value indicates that the signal arrives later than required and is thus the target for optimization or correction. These various pieces of timing data may be further referenced in pruning techniques described below at 208 and 210.

The global set of views may be optionally reduced at 208 into a globally pruned set of views. More specifically, each view in the global set of views may be examined to determine whether this view and thus the timing data associated therewith are needed for at least one connection of an electronic design during a timing analysis. A view is needed for timing analyses when the view is at least one of a violating view, a worst view, or a propagated worst view. More details about a violating view, a worst view, and a propagated worst view will be described below with reference to reference numeral 210.

The global set of views may be reduced at 208 into a globally reduced set of views by performing global view-based pruning to disable, ignore, or discard one or more views. A view may be disabled, ignored, or discarded (collectively "disable" for active voice or "disabled" for passive voice) if it is determined that this view is not needed for all connections in a timing analysis of an electronic design. Once this view is pruned from the global set of views, the associated timing data will not be populated for physical optimizations or physical corrections. Therefore, this optional global pruning process may conserve computational resources such as runtime and memory footprint due to a smaller amount of data to process. Nonetheless, this global pruning of views from the original, global set of views tends to be conservative because a view will not be pruned from the global set of views even if this view is only needed for the analysis of one or a few connections out of many other connections in the electronic design.

The global set of views or the globally pruned set of views may be reduced at 210 into a set of active views by performing begin and end point pruning. In some embodiments, the begin and end point pruning technique prunes views that are not violating views, worst views, or propagated worst views so that these views are disabled and need not be considered in subsequent physical optimizations or corrections or timing closure. The begin and end point pruning techniques selectively and locally prune at least one view from the global set of views for a first node (e.g., a gate) while maintaining the same at least one view in the set of active views for a second node in the electronic design. These begin and end point pruning techniques are in sharp contrast with global pruning techniques that non-selectively and globally disable a view across the entire electronic design and thus often do not provide much advantages in terms of conserving computational resources, especially for large or complex electronic designs.

In some of these embodiments, a violating view includes a view where an associated slack has a negative slack value at one or more pins in an electronic design. A worst view includes a view associated with a begin point or an end point of a timing path where this view has the worst slack value (e.g., smallest positive slack value). A propagated worst view includes a view associated with a pin where this view is identified due to the propagation of a worst view from a begin point or an end point in a forward or backward direction. Such a pin may be a begin point or an end point of a timing path or any pins or ports in between, Therefore, a begin point may correspond to both a worst view and a propagated worst view. Similarly, an end point may also correspond to both a worst view and a propagated worst view. More details about propagated worst views are provided below with reference to FIGS. 3C-3E; and more details about begin and end point pruning will be described below with reference to FIG. 2. Some examples of begin and end point pruning are provided below with reference to FIGS. 3A-3E.

Once the set of active views is determined, various types of delays may be characterized at 212 by performing a timing analysis with the set of active views or data associated therewith. A smaller amount of timing data associated with the set of active views, rather than or instead of the global set of views or the globally pruned set of views, may be loaded for timing analysis. With this smaller amount of timing data, the timing analysis and hence the physical optimization may be performed in a more efficient manner consuming less computational resources.

These various types of delays may generally include, for example, path delays that further comprise cell delays and interconnect delays in some embodiments. A cell delay and interconnect delay includes the total time needed to charge or discharge the parasitics (e.g., resistance, capacitance, inductance, etc.) of a net and is thus related to the resistance, the capacitance, and the topology of the net. Cell delays and interconnect delays may be determined by using one or more models such as a lumped capacitor model, a lumped RC model, a distributed RC model, an RLC model, a transmission line model, the Elmore delay model, etc. A cell delay includes the delay between an input pin and an output pin of a cell and is often included in a library file of the cell.

Physical optimizations, physical corrections, or timing signoff may be performed at 214 based on the results of the timing analysis at 212. In some embodiments, the process may iterate through the timing analysis at 212 and the physical optimizations, corrections, or signoff timing closure at 214 more than once. The smaller amount of data loaded based on the set of active views may further enhance the performance and reduce computational resource consumption in this iterative process due to repeated executions of these sub-processes with the smaller amount of data. Once the objectives are achieved, the electronic design and the associated data (e.g., the physical design, the timing graph, timing data, etc.) may be stored at 216 in one or more transient or persistent data structures. In some embodiments where the electronic design and the associated data are stored in one or more transient data structures at 216, the process illustrated in FIG. 1 may return to 214 to iteratively perform the physical optimizations, corrections, or signoff timing closure to obtain required or desired results. In some other embodiments where the electronic design and the associated data are stored in one or more persistent data structures at 216, the performance of the physical optimizations, corrections, or signoff timing closure may be iterative at 214 until required or desired results are achieved. In some embodiments, the electronic design may be further processed with one or more modules (e.g., the modules described with reference to FIG. 4) to ensure that the processed electronic design is ready for manufacturing.

Figure 2:
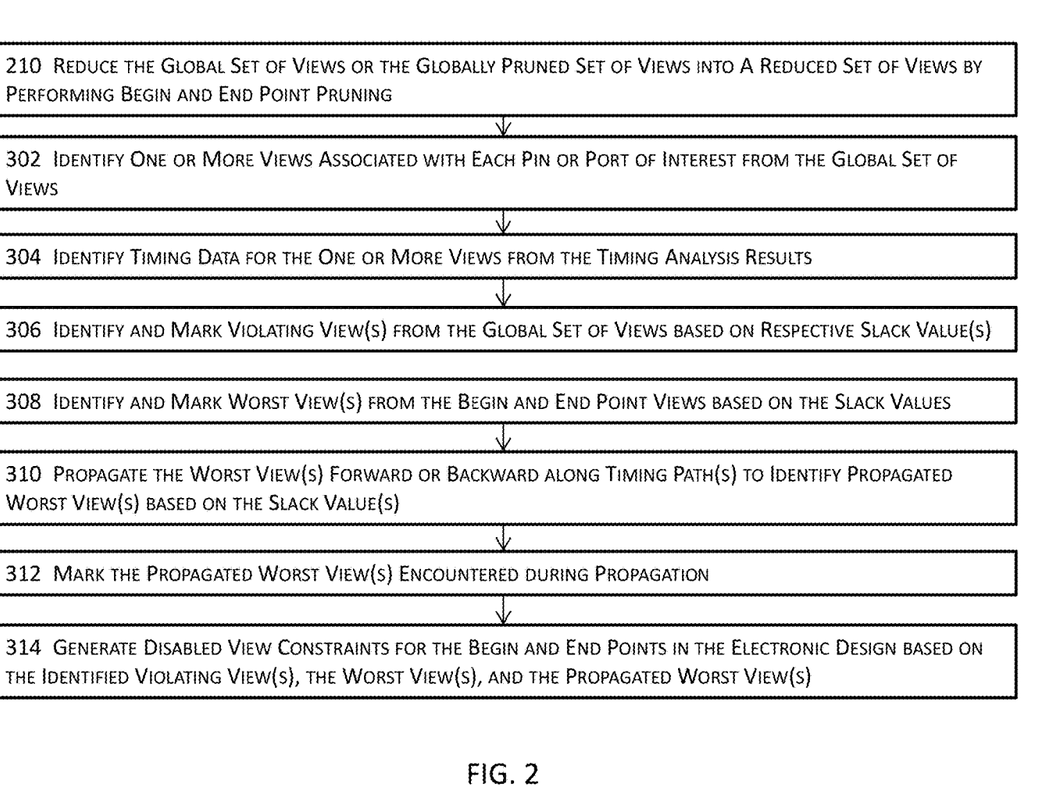
FIG. 2 illustrates a more detailed block diagram for the begin and end point pruning technique for an electronic design in one or more embodiments.

FIG. 2 illustrates a more detailed block diagram for the begin and end point pruning technique for an electronic design in one or more embodiments. In these one or more embodiments, one or more views associated with each pin or port of interest along a timing path in an electronic design may be identified at 302.

Timing data (e.g., slack values) for each view associated with each pin or port of interest may be identified at 304. The identified timing data may be further referenced in the begin and end point pruning of the views associated or annotated with each of the pin or port of interest. With the timing data identified for the sets of views associated with the pins or ports of interest, violating views may be identified at 306. These violating views may also be marked or flagged in some embodiments, or the information thereof may be logged in a data structure. These identified violating views are a target for physical optimizations or corrections and will thus be eventually categorized into the set of active views as described below with reference to disabled view constraints.

The worst view may also be identified at 308 for each begin point and end point. Although a worst view for a pin or port of interest may be associated with a positive slack value indicating the arrival time is earlier than the required time, the worst view for a pin or port has the worst slack value of all the views associated with the same pin or port and may thus be another target for optimization or correction. In some embodiments, the worst views are identified at 308 for only the begin points and the end points, while the remaining pins or ports of interest are ignored at this stage. Although the worst views associated with the remaining pins or ports may also be a target for optimization or correction, these remaining pints or ports will be accommodated by view propagation (with reference to 310) and thus need not be identified, marked, or flagged at 308.

Timing paths may include data paths, clock paths, clock gating paths, asynchronous paths. A timing path has a begin point and an end point. Begin points and end points may slightly differ depending on the types of timing paths. For example, a begin point may generally refer to a place along a data path in an electronic design where data is launched by a clock edge. The data is then propagated along the data path and is eventually captured at the end point of the data path. For a data path, a begin point includes an input port or a clock pin of a device (e.g., a flip-flop, a register, a latch, etc.), and an end point includes an output port of the data path or a data input pin of a device (e.g., another flip-flop, register, latch, etc.) For a clock path, a begin point includes a clock input port, and an end point includes a clock pin of a device (e.g., a flip-flop, a register, a latch, etc.) For a clock gating path, a begin pin includes an input port of the design, and an end point includes an input port of a clock-gating element. For an asynchronous path, a begin point includes an input of the asynchronous path, and an end point includes a set pin, a reset pin, or a clear pin of a device (e.g., a flip-flop, a register, a latch, etc.)

The worst views identified for the begin points and end points at 308 may be propagated at 310 in the forward or backward directing along the corresponding timing paths to identify one or more propagated worst views based in part or in whole upon their respective timing data. For example, if a first view is associated with the same or worse slack value than the worst view being propagated, this first view is also identified as a propagated worst view. On the other hand, if a second view encountered during the worst view propagation is associated with a better slack value (e.g., a larger positive slack value) than the slack value of the worst view being propagated, then this second view is not identified as a propagated worst view.

These one or more propagated worst views may then be marked or flagged at 312. Disabled view constraints may then be generated at 314 for the electronic design based at least in part on the identified violating views, the worst views, and the propagated worst views. For example, a disabled view constraint for a pin or port of interest may include the instructions to disable views other than the violating view (if any), the worst view, and any propagated worst views for the pin of interest. Because disabled view constraints may be generated for a pin or port of interest to disable views that are not needed for the successful completion of physical optimization at this pin or port of interest, the original global set of views or the globally pruned set of views may be selectively and locally performed on a connection by connection basis. This begin and end point pruning technique thus completely avoids the pessimism or conservatism of global pruning techniques. In some embodiments, disabled view constraints are generated only on begin and end points of timing paths. Moreover, more reduction in the consumption of computational resources is achieved due to the even smaller amount of data due to the selective and local pruning while accurately observing and portraying the multiple modes and multiple corners. With these disabled view constraints, the set of active views may be generated by pruning the global set of views or the globally pruned set of views with the generated disabled view constraint. A practical example of the operations of the begin and end point pruning is provided below with reference to FIGS. 3A-3E.

FIGS. 3A-3E illustrate a timing graph of a portion of an electronic design to which various techniques for multi-mode, multi-corner physical optimization of electronic designs may be applied in one or more embodiments.

Figure 3A:
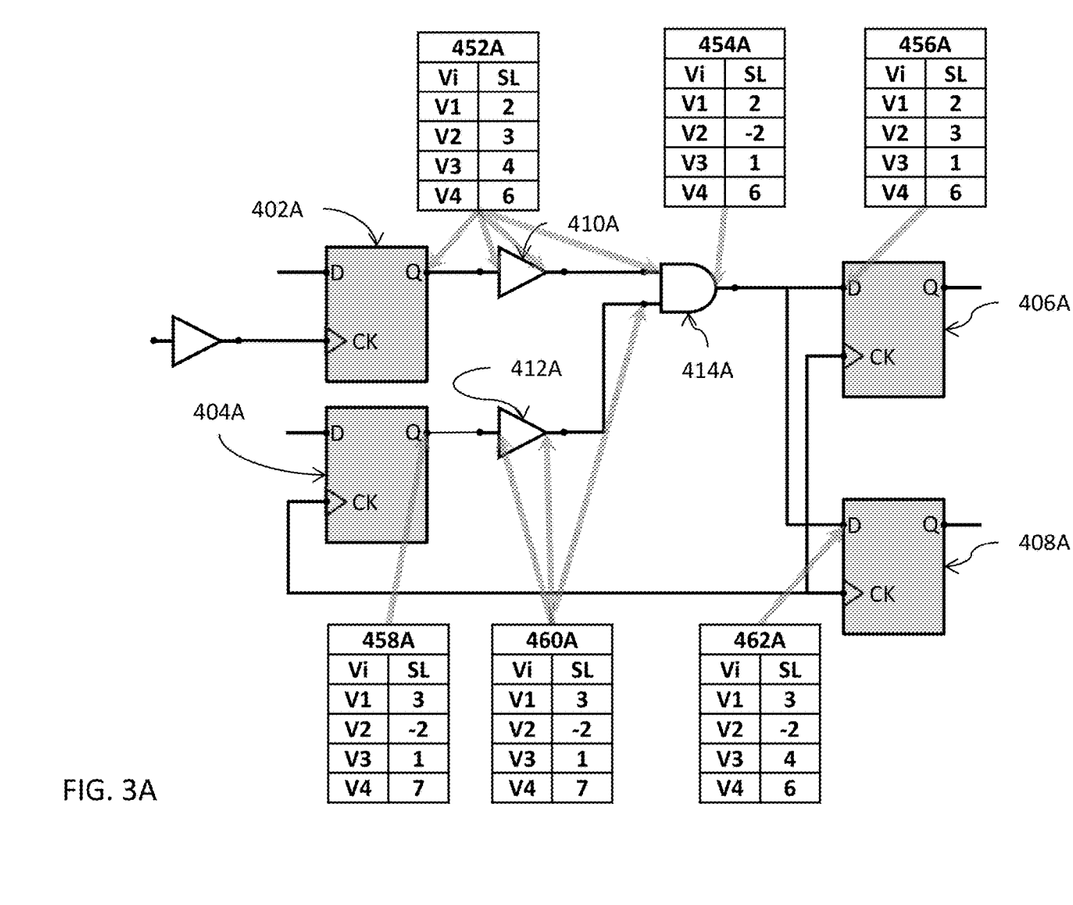
FIGS. 3A-3E illustrate an example of a portion of an electronic design to which various techniques for multi-mode, multi-corner physical optimization of electronic designs may be applied in one or more embodiments.

In the examples illustrated in FIG. 3A, each pin or port of interest is associated with one or more views that are generated based on multiple modes and multiple corners for the corresponding pin or port of interest. The timing data associated with each pin or port of interest is also identified from, for example, a timing analysis such as the one performed at 206. It shall be noted that only slack values associated with each view of a pin or port of interest are shown in FIGS. 3A-3E for the ease of illustration and explanation. That is, delay information is not shown although delay information may nevertheless be used in slack calculations; and the techniques described herein may be applied with full and equal effects with other suitable types of timing data.

In FIG. 3A, a set of views and corresponding slack values 452A are associated with various pins of flip-flop 402A, buffer 410A, and AND gate 414A. A set of views and corresponding slack values 454A are associated with the output pin of AND gate 414A. A set of views and corresponding slack values 456A are associated with the D-input pin of flip-flop 406A. A set of views and corresponding slack values 458A are associated with the Q-output pin of flip-flop 404A. A set of views and corresponding slack values 460A are associated with the input and output pins of buffer 412A. A set of views and corresponding slack values 462A are associated with the D-input pin of flip-flop 408A. These sets of timing data are populated based on a global set of views that is determined based on the multiple modes and multiple corners for the electronic design illustrated in FIG. 3A.

Figure 3B:
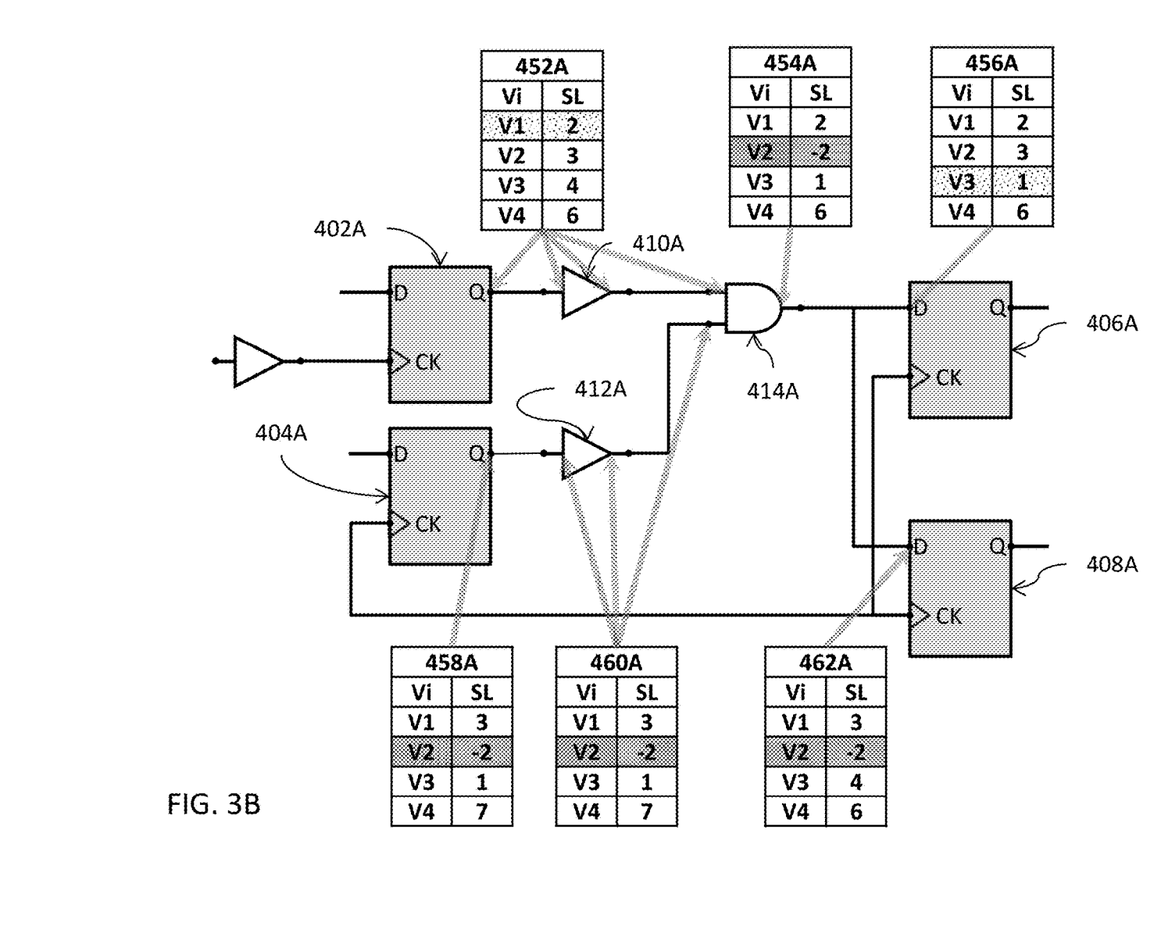

FIG. 3B illustrates an example of identification and marking of violating views from the global set of views and corresponding timing data associated or annotated with various pins or ports of interest. In this example, all the views corresponding to negative slack values are identified. For example, view "V2" of set 454A, 458A, 460A, and 462A are identified as violating views because of the negative slack values associated therewith. These violating views may be marked or flagged in the timing graph in some embodiments or in another data structure in some other embodiments.

FIG. 3B further illustrates the identification and marking of worst views for begin points and end points with the techniques described above with reference to 308 of FIG. 2. For example, for the timing data at the Q-output pin of flip-flop 402A, view "V1" has the smallest slack view and is thus the worst view as far as the Q-output pin is concerned. View "V1" may thus be identified as a worst view. Similarly, View "V3" of D-input pin of flip-flop 406A also has the smallest slack value among the four views and is thus identified as another worst view.

Figure 3C:
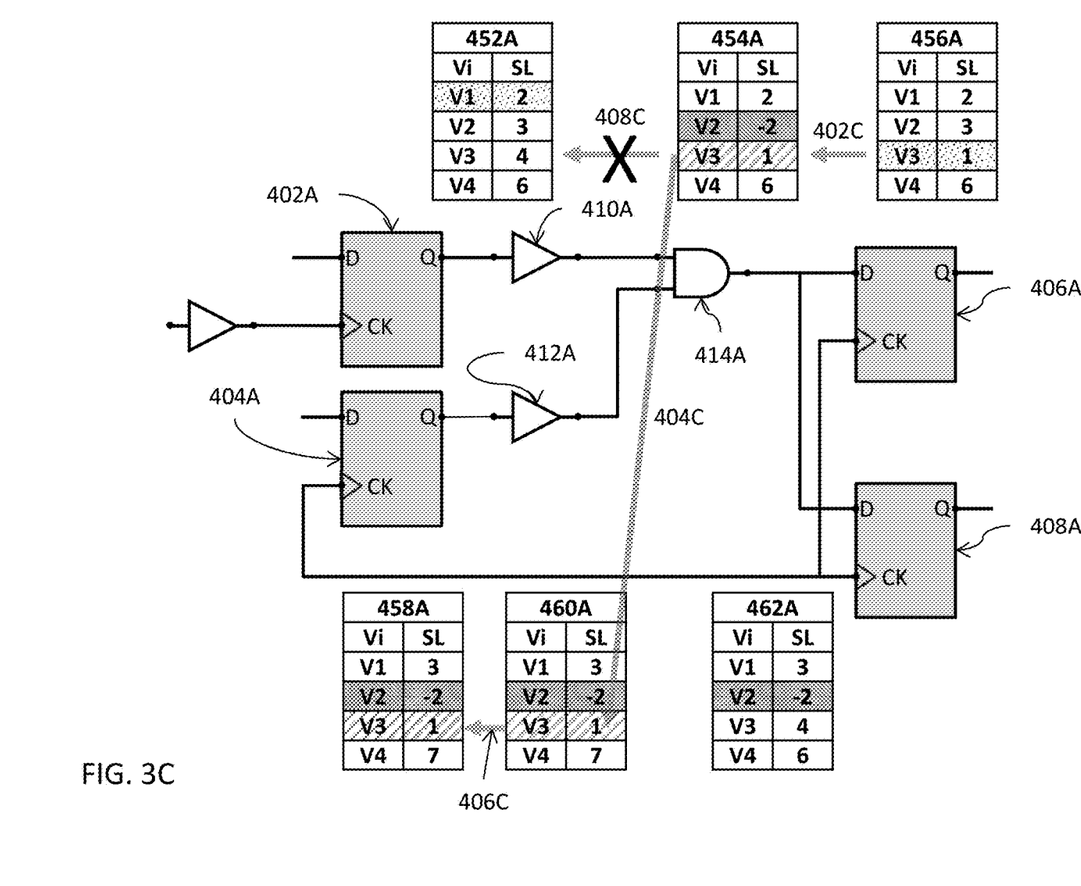

FIG. 3C illustrates an example of worst view propagation as described above with reference to 310 of FIG. 2. Two worst views "V3" of 456A and "V1" of 452A are identified in FIG. 3B. A view propagation module may propagate the worst view "V3" of 456A in the backward direction. View "V3" of 454A is encountered first during the propagation (402C) and may be identified as a propagated worst view if the slack value of view "V3" of 454A is equal to or smaller than the slack value of the worst view "V3" of 456A. In this example, view "V3" of 454A has the slack value of "1" and is thus identified as a propagated worst view. The backward propagation continues and encounters view "V3" of 452A that corresponds to a slack value of "4" via 408C. View "V3" of 452A is not identified as a propagated worst view because its slack value is greater than that of the worst view. AND gate 414A represents a divergent point during the backward propagation which may thus proceed via 404C to view "V3" of 460A corresponding to a slack value of "1". Because this slack value is equal to or smaller than that of the worst view "V3" of 456A, view "V3" of 460A is thus identified as another propagated worst view. The backward propagation continues via 406C, and view "V3" of 458A is similarly identified as another propagated worst view for the set 458A.

Figure 3D:
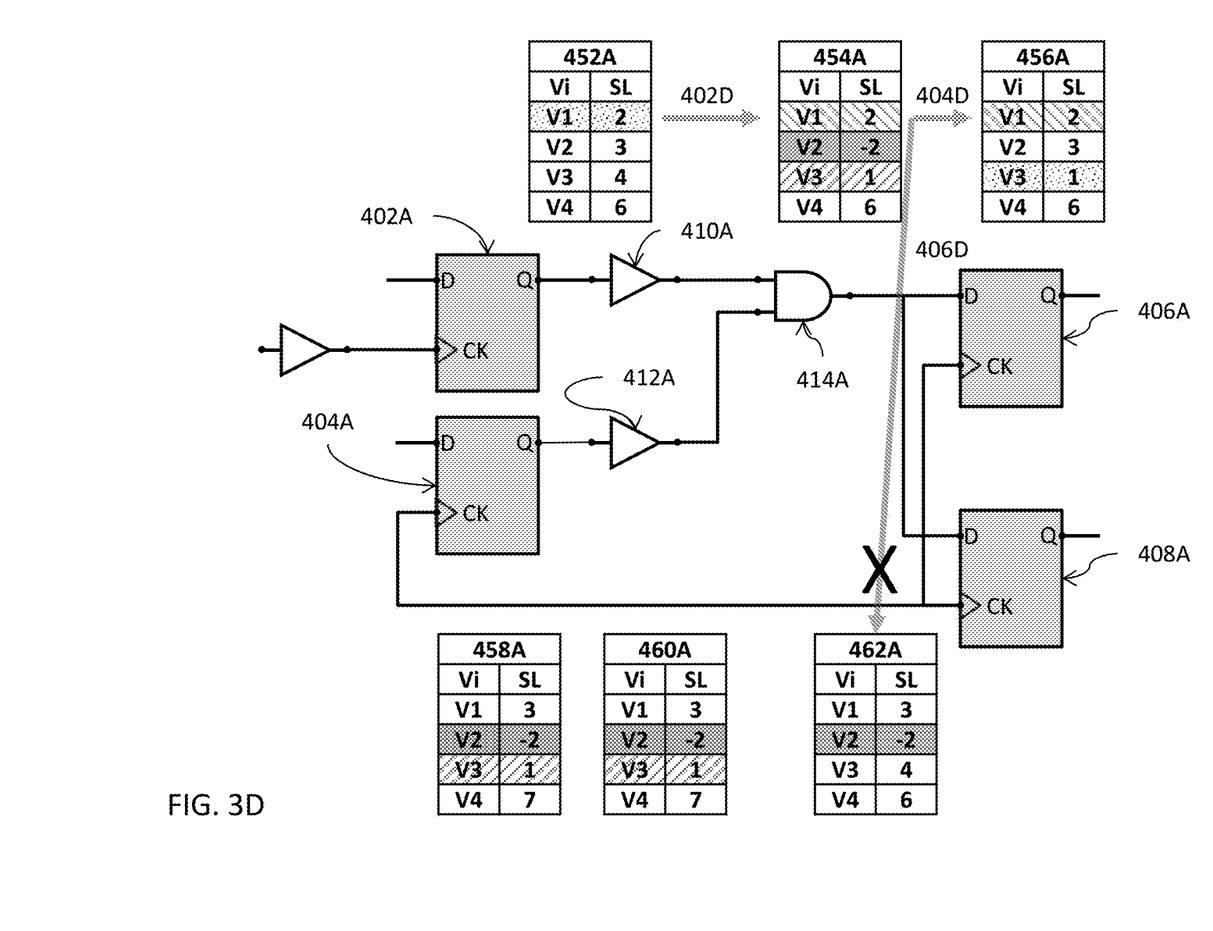

FIG. 3D illustrates another example of worst view propagation as described above with reference to 310 of FIG. 2. View "V1" of 452A is also identified as a worst view. The view propagation module may propagate this worst view in the forward direction and encounter view "V1" of 454A corresponding to a slack value of "2" via 402D. Because this slack value is equal to or smaller than that of the worst view "V1" of 452A, view "V1" of 454A is identified as a propagated worst view for the set 454A. The view propagation module continues to propagate this worst view in the forward direction via 404D and encounters view "V1" of 456A corresponding to a slack value of "2". Because this slack value is equal to or smaller than that of the worst view "V1" of 452A, view "V1" of 456A is identified as a propagated worst view for the set 456A. The AND gate 414A represents a convergent point in forward propagation which may thus proceed via 406D to encounter view "V1" of 462A corresponding to a slack value of "3". Because this slack value of "3" is greater than that (a value of "2") of the worst view being propagated, view "V1" of the set 462A is thus not identified as a propagated worst view.

Figure 3E:
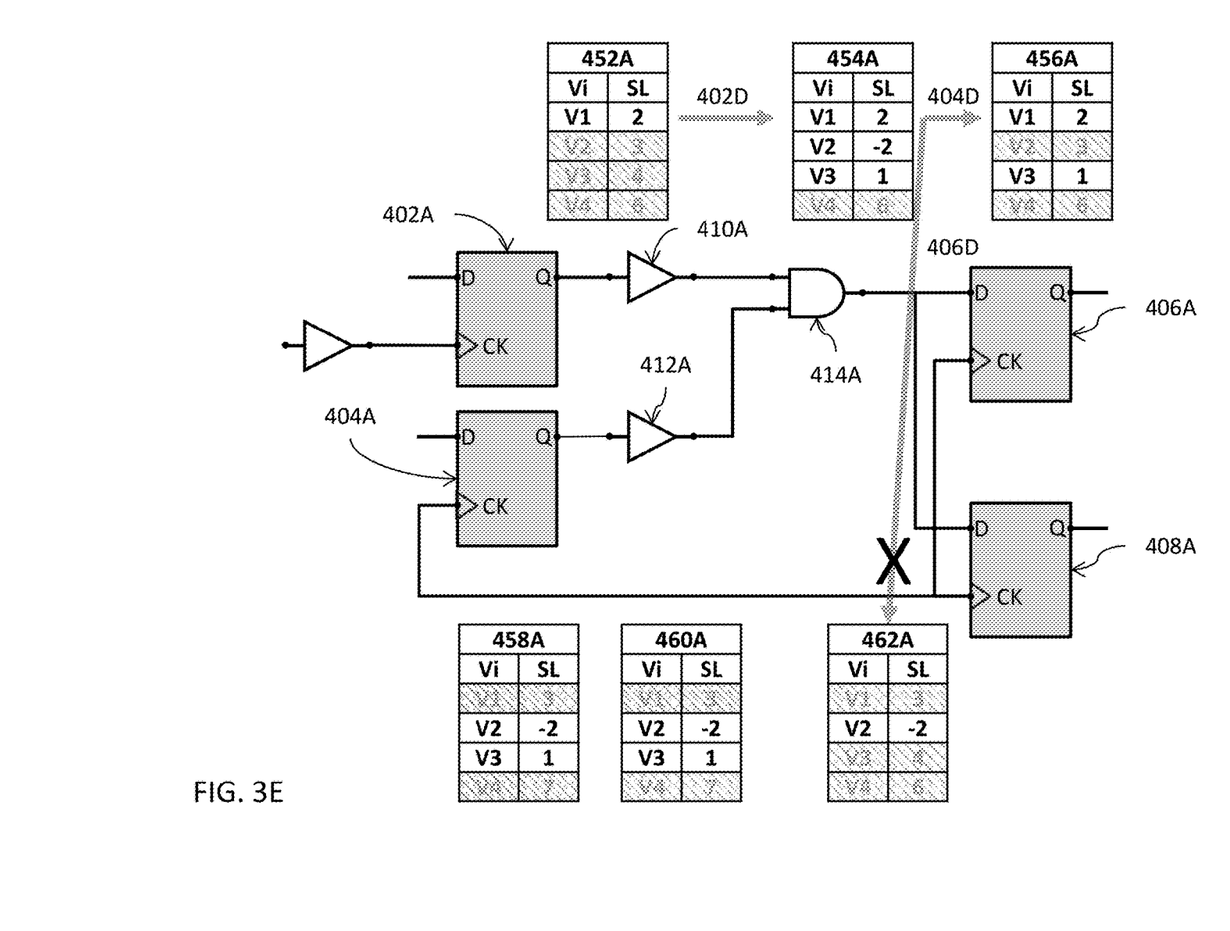

FIG. 3E illustrates the generation and application of disabled view constraints for begin and end point pruning. With the identified violating views (see FIG. 3B), the worst views (FIG. 3B), and the propagated worst views (FIGS. 3C-3D), disabled view constraints may be generated for each of the pins and ports of interest. A disabled view constraints may include instructions to disable one or more views for a pin or port of interest or to identify one or more other views as active views. For example, a disabled view constraint may be generated to disable views "V1" or to identify views "V2", "V3", and "V4" as active views for 452A. As another example, another disabled view constraint may be generated to disable views "V4" or to identify views "V1", "V2", and "V3" as active views for 454A. In some embodiments, active views associated with a pin or port of interest may be marked, identified, or flagged in a data structure. In some other embodiments, disabled views associated with a pin or port of interest may be marked, identified, or flagged in a data structure. During subsequent physical optimizations or corrections, the timing data for active views will be populated, whereas the timing data for disabled views will not.

In this example illustrated in FIGS. 3A-E, none of these 24 sets of timing data for the pins and ports of interest will be disabled or pruned by global pruning techniques. The described begin and end point pruning techniques effectively pruned 13 sets of timing data from the total 24 sets of timing data. These sets of timing data corresponding to these disabled views are not needed and thus will not be populated during subsequent physical optimizations, corrections, and signoff. As a result, these techniques described herein reduce the requirement and consumption of computational resources without comprising any of the modes or corners.

Figure 4:
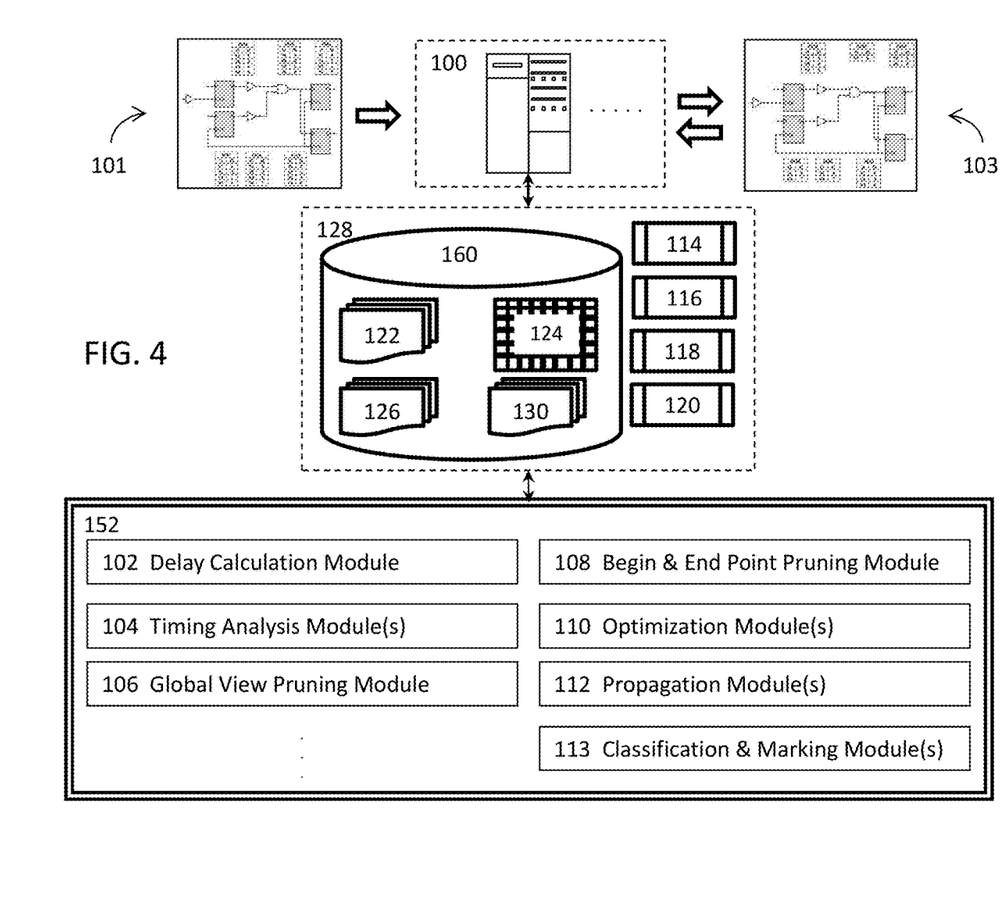
FIG. 4 illustrates a high level schematic block diagram for multi-mode, multi-corner physical optimization of electronic designs in one or more embodiments.

FIG. 4 illustrates a high level schematic block diagrams for multi-mode, multi-corner physical optimization of electronic designs in one or more embodiments. More specifically, FIG. 4 illustrates a high level schematic block diagram for a platform for multi-mode, multi-corner physical optimization of electronic designs and may comprise one or more computing systems 100, such as a general purpose computer described in the System Architecture Overview section to implement one or more special proposes. The one or more computing systems 100 invoke various modules in the set of modules 152 to reduce a global set of views 101 into a set of active views 103 for an electronic design. In subsequent physical optimizations or corrections for the electronic design, the platform may populate timing data for this set of active views, instead of the global set of views, and perform one or more various optimization tasks to achieve timing closure with a shorter runtime and a smaller memory footprint due to a smaller number of views and hence a smaller amount of data to be populated for the physical optimizations or corrections. More details about various processes or operations performed by the platform illustrated in FIG. 4 will be described in subsequent paragraphs with reference to FIGS. 1-3E.

In some embodiments, the computing system 100 may include various resources 128 such that these various resources may be invoked from within the computing system via a computer bus architecture (e.g., a data bus interfacing a microprocessor and the non-transitory computer accessible storage medium, a system bus between a microprocessor and one or more engines in the various resources 128, a control bus, a data bus, or any combinations thereof). These various resources 128 that may comprise a floorplanner, a placement tool, a global routing engine, and/or a detail routing engine (collectively 114), a layout editor 116, a design rule checker 118, a verification engine 120, etc. In some other embodiments, some or all of these various resources may be located remotely from the computing system 100 such that the computing system may access some or all of these resources via a computer bus and one or more network components.

The one or more computing systems 100 may further write to and read from a local or remote non-transitory computer accessible storage 160 that stores thereupon data or information such as one or more databases (124) (e.g., a schematic design database, a physical design database, an electronic circuit design specification database, etc.) In addition to constraints, requirements, or rules (collectively "constraints" 122) such as disabled view constraints described above, the data or information may also include various statistics, various data, rule decks, various design rules, etc. (122), or other information or data (130) that may be used to facilitate the performance of various functions to achieve the intended purposes.

The set of modules 152 may comprise one or more modules to ensure that physical designs processed by these one or more modules are ready for manufacturing or tapeout, and that the electronic circuits as manufactured meet or exceed various requirements and objectives. A module is initialized in a computing system so that the software portion of the module is stored in memory (e.g., random access memory) for execution by one or more processors or processor cores of the one or more computing systems 100 to perform at least a part of the functionality of the module. For example, a delay calculation module 102 may be invoked to calculate gate delays of logic gates as well as the wires attached to these logic gates. One or more timing analysis modules 104 may be invoked to characterize timing information at a plurality of pins, ports, or combinations thereof by performing timing analyses including, for example, a static timing analysis, a statistical static timing analysis, or any other suitable timing analyses, etc. In some embodiments, these one or more timing analysis modules characterize the timing information at each pin or port of an electronic design or a portion thereof.

A global view pruning module 106 may also be optionally invoked to identify and prune one or more views from an entire electronic design such that timing data for these views are not populated for physical optimizations of the electronic design. For example, a global view pruning module 106 may determine that a view corresponding to a mode or a corner may not be needed for accurately characterizing timing information at a plurality of pins, ports, or combinations thereof for the entire electronic design, this view may be pruned from the global set of views so that timing data associated with this view is not populated in subsequent physical optimizations or corrections.

A begin and end point pruning module 108 may be invoked to selectively and locally prune views for each pin or port in an electronic design from the global set of views to generate a set of active views while accommodating the multiple modes and multiple corners. More details about begin and end point pruning are described above with reference to FIGS. 1-3E. One or more optimization modules 110 may be optionally invoked to perform physical optimizations, physical corrections, timing closure, etc. with the set of active views generated by the begin and end point pruning module 108 for physical electronic designs such as post-placement or post-route electronic designs.

A classification and marking module 113 may further be invoked to mark, annotate, or associate various views with pins or ports of various flip-flops and registers in an electronic design. For example, an input pin of a flip-flop may be marked, annotated, or associated with a particular view (e.g., a violating view, a worst view, a disabled view, etc.) A propagation module 112 may also be invoked to propagate markings or identifications of views at a pin or a port in the forward or backward direction. More details about the operations of the propagation module 112 and the classification and marking module 113 will be described above with reference to FIGS. 3A-3E.

One or more signoff modules (not shown) to perform various signoff and design closure tasks. For example, the one or more signoff modules may perform various verification tasks (e.g., silicon-accurate timing signoff, signal integrity analyses, etc.) to ensure an electronic design meets power, performance, or other requirements before tapeout. These one or more signoff modules may also include one or more signoff parasitic extraction modules to provide silicon-accurate interconnect parasitic extraction and ensure first-pass silicon success. In addition or in the alternative, one or more power signoff modules may also be invoked to perform various power integrity analyses, transistor-level electro-migration and IR-drop analyses, or other power and signal integrity analyses to ensure an electronic design meets or exceeds power, performance, and/or area goals.

System Architecture Overview

Figure 5:
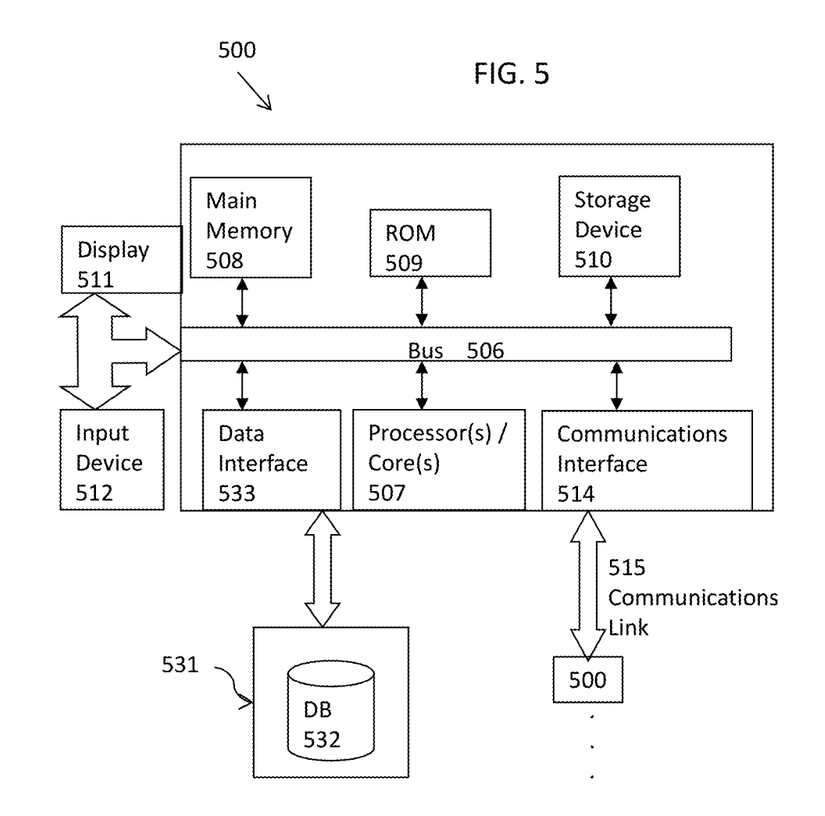
FIG. 5 illustrates a computerized system on which a method for multi-mode, multi-corner physical optimization of electronic designs may be implemented.

FIG. 5 illustrates a block diagram of an illustrative computing system 500 suitable for multi-mode, multi-corner physical optimization of electronic designs as described in the preceding paragraphs with reference to various figures. Computer system 500 includes a bus 506 or other communication module for communicating information, which interconnects subsystems and devices, such as processor 507, system memory 508 (e.g., RAM), static storage device 509 (e.g., ROM), disk drive 510 (e.g., magnetic or optical), communication interface 514 (e.g., modem or Ethernet card), display 511 (e.g., CRT or LCD), input device 512 (e.g., keyboard), and cursor control (not shown).

According to one embodiment, computing system 500 performs specific operations by one or more processor or processor cores 507 executing one or more sequences of one or more instructions loaded in system memory 508. Such instructions may be read into system memory 508 from another computer readable/usable storage medium, such as static storage device 509 or disk drive 510. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 507, where the one or more processors, one or more processor cores, or combination thereof executes one or more threads. For example, various acts of determination, compression, decompression, etc. may be performed by one or more modules (e.g., one or more modules described in FIG. 4) including or functioning in tandem with one or more processors, one or more processor cores, or combination thereof.

A module described herein may also be implemented as a pure hardware module (e.g., a block of electronic circuit components, electrical circuitry, etc.) or a combination of a hardware module and a software block that jointly perform various tasks to achieve various functions or purposes described herein or equivalents thereof. For example, a module described herein may be implemented as an application-specific integrated circuit (ASIC) in some embodiments.

In these embodiments, a module may be stored at least partially in memory and may also include or function in tandem with, for example, a microprocessor or a processor core and other supportive electrical circuitry to perform specific functions which may be coded as software or hard coded as a part of an application-specific integrated circuit, ROM (read only memory), PROM (programmable read only memory), EPROM (erasable programmable read only memory), etc. despite the fact that these microprocessor, processor core, and electrical circuitry may nevertheless be shared among a plurality of module. A module described herein or an equivalent thereof may perform its respective functions alone or in conjunction with one or more other modules. A module described herein or an equivalent thereof may thus invoke one or more other modules by, for example, issuing one or more commands, function calls, or interprocess communications. The invocation of one or more other modules may be fully automated or may involve one or more user inputs. To the extent that a module includes a piece of software, the software is stored in a non-transitory computer accessible storage medium such as computer memory.

The term "computer readable storage medium" or "computer usable storage medium" as used herein refers to any non-transitory computer accessible storage medium that participates in providing instructions to processor 507 for execution. Such a medium may take many forms, including but not limited to, non-volatile media and volatile media. Non-volatile media includes, for example, optical or magnetic disks, such as disk drive 510. Volatile media includes dynamic memory, such as system memory 508. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 500. According to other embodiments of the invention, two or more computer systems 500 coupled by communication link 515 (e.g., LAN, PTSN, or wireless network) may perform the sequence of instructions required to practice the invention in coordination with one another.

Computer system 500 may transmit and receive messages, data, and instructions, including program, i.e., application code, through communication link 515 and communication interface 514. Received program code may be executed by processor 507 as it is received, and/or stored in disk drive 510, or other non-volatile storage for later execution. In an embodiment, the computing system 500 operates in conjunction with a data storage system 531, e.g., a data storage system 531 that includes a database 532 that is readily accessible by the computing system 500. The computing system 500 communicates with the data storage system 531 through a data interface 533. A data interface 533, which is coupled with the bus 506, transmits and receives electrical, electromagnetic or optical signals that include data streams representing various types of signal information, e.g., instructions, messages and data. In embodiments of the invention, the functions of the data interface 533 may be performed by the communication interface 514.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing electronic designs, comprising:
    identifying an electronic design and a global set of views, wherein the electronic design is provided for manufacturing or fabricating electronic circuits represented by the electronic design;
    characterizing timing information with the global set of views for the electronic design;
    generating, at a pruning module stored at least partially in memory of and functioning in conjunction with at least one microprocessor of a computing system, a set of active views at least by pruning one or more views from the global set of views for a first node in the electronic design while maintaining the one or more views for a second node in the set of active views;
    generating one or more first data structures for storing the timing information corresponding to the set of active views from a plurality of data structures corresponding to the global set of views;
    associating the electronic design with the set of active views stored in a view data structure in a non-transitory computer accessible storage medium; and
    implementing the electronic design at least with one or more physical corrections or enhancements and the view data structure at least by populating the electronic design with a first portion of the timing information in the one or more first data structures, while disabling a second portion of the timing information corresponding to the global set of views from being populated for implementations of the one or more physical corrections or enhancements.

2. The computer implemented method of claim 1, further comprising:
    reducing the global set of views into a globally pruned set of views at least by disabling one or more views in the global set of views with global pruning.

3. The computer implemented method of claim 1, further comprising:
    performing physical optimizations for the electronic design with the set of active views in a data structure.

4. The computer implemented method of claim 1, the act of characterizing the timing information comprising:
    determining delay data in the timing information at least by performing one or more delay calculations on the electronic design; and
    determining timing data in the timing information at least by performing one or more timing analyses on the electronic design with the global set of views.

5. The computer implemented method of claim 1, the act of generating the set of active views comprising:
    identifying a plurality of pins or ports of interest from the electronic design;
    determining one or more views respectively associated with the plurality of pins or ports of interest from the global set of views; and
    determining timing information for the one or more views respectively associated with the plurality of pins or ports of interest.

6. The computer implemented method of claim 5, the act of generating the set of active views comprising:
    determining zero or more violating views from the one or more views based in part or in whole upon the timing information; and
    marking the zero or more violating views in a data structure.

7. The computer implemented method of claim 6, the act of generating the set of active views further comprising:
    identifying one or more begin points and one or more end points from the electronic design;
    determining at least one worst view from the one or more views respectively associated with at least one begin point or end point of the one or more begin points and the one or more end points based in part or in whole upon the timing information; and
    marking the at least one worst view in the data structure.

8. The computer implemented method of claim 7, the act of generating the set of active views further comprising:
    propagating the at least one worst view along a timing path in a forward or backward direction; and
    identifying one or more propagated worst views for the at least one worst view based in part or in whole upon the timing information associated with the one or more propagated worst views and the at least one worst view.

9. The computer implemented method of claim 8, the act of generating the set of active views further comprising:
    generating a disabled view constraint for the at least one begin point or end point based in part or in whole upon the zero or more violating views, the at least one worst view, and the one or more propagated worst views; and
    disabling at least one view from the one or more views associated with the at least one begin point or end point by applying the disabled view constraint.

10. A system for implementing electronic designs, comprising:
one or more modules, at least one of which is stored in part or in whole in memory and comprises at least one processor executing one or more threads in at least one computing system; and
a non-transitory computer readable storage medium storing thereupon program code including a sequence of instructions that, when executed by the at least one processor, causes the at least one processor at least to:
identify an electronic design and a global set of views, wherein the electronic design is provided for manufacturing or fabricating electronic circuits represented by the electronic design;
characterize timing information with the global set of views for the electronic design;
a pruning module stored at least partially in memory of and functioning in conjunction with at least one microprocessor of a computing system and configured to generate a set of active views at least by pruning one or more views from the global set of views for a first node in the electronic design while maintaining the one or more views for a second node in the set of active views;
generate one or more first data structures for storing the timing information corresponding to the set of active views from a plurality of data structures corresponding to the global set of views;
associate the electronic design with the set of active views stored in a view data structure in a non-transitory computer accessible storage medium; and
implement the electronic design at least with one or more physical corrections or enhancements and the view data structure at least by populating the electronic design with a first portion of the timing information in the one or more first data structures, while disabling a second portion of the timing information corresponding to the global set of views from being populated for implementations of the one or more physical corrections or enhancements.

11. The system of claim 10, wherein the program code includes the sequence of instructions that, when executed by the at least one processor, further cause the at least one processor to:
reduce the global set of views into a globally pruned set of views at least by disabling one or more views in the global set of views with global pruning; and
perform physical optimizations for the electronic design with the set of active views in a data structure.

12. The system of claim 10, wherein the program code includes the sequence of instructions that, when executed by the at least one processor, further cause the at least one processor to:
determine delay data in the timing information at least by performing one or more delay calculations on the electronic design; and
determine timing data in the timing information at least by performing one or more timing analyses on the electronic design with the global set of views.

13. The system of claim 10, wherein the program code includes the sequence of instructions that, when executed by the at least one processor, further cause the at least one processor to:
identify a plurality of pins or ports of interest from the electronic design;
determine one or more views respectively associated with the plurality of pins or ports of interest from the global set of views;
determine timing information for the one or more views respectively associated with the plurality of pins or ports of interest;
determine zero or more violating views from the one or more views based in part or in whole upon the timing information; and
mark the zero or more violating views in a data structure.

14. The system of claim 13, wherein the program code includes the sequence of instructions that, when executed by the at least one processor, further cause the at least one processor to:
identify one or more begin points and one or more end points from the electronic design;
determine at least one worst view from the one or more views respectively associated with at least one begin point or end point of the one or more begin points and the one or more end points based in part or in whole upon the timing information;
mark the at least one worst view in the data structure;
propagate the at least one worst view along a timing path in a forward or backward direction; and
identify one or more propagated worst views for the at least one worst view based in part or in whole upon the timing information associated with the one or more propagated worst views and the at least one worst view.

15. The system of claim 14, wherein the program code includes the sequence of instructions that, when executed by the at least one processor, further cause the at least one processor to:
generate a disabled view constraint for the at least one begin point or end point based in part or in whole upon the zero or more violating views, the at least one worst view, and the one or more propagated worst views; and
disable at least one view from the one or more views associated with the at least one begin point or end point by applying the disabled view constraint.

16. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for multi-mode, multi-corner physical optimization of electronic designs, the set of acts comprising:
identifying an electronic design and a global set of views, wherein the electronic design is provided for manufacturing or fabricating electronic circuits represented by the electronic design;
characterizing timing information with the global set of views for the electronic design;
generating, at a pruning module stored at least partially in memory of and functioning in conjunction with at least one microprocessor of a computing system, a set of active views at least by pruning one or more views from the global set of views for a first node in the electronic design while maintaining the one or more views for a second node in the set of active views;
generating one or more first data structures for storing the timing information corresponding to the set of active views from a plurality of data structures corresponding to the global set of views;
associating the electronic design with the set of active views stored in a view data structure in a non-transitory computer accessible storage medium; and
implementing the electronic design at least with one or more physical corrections or enhancements and the view data structure at least by populating the electronic design with a first portion of the timing information in the one or more first data structures, while disabling a second portion of the timing information corresponding to the global set of views from being populated for implementations of the one or more physical corrections or enhancements.

17. The article of manufacture of claim 16, the set of acts further comprising:
reducing the global set of views into a globally pruned set of views at least by disabling one or more views in the global set of views with global pruning;
performing physical optimizations for the electronic design with the set of active views in a data structure;
determining delay data in the timing information at least by performing one or more delay calculations on the electronic design; and
determining timing data in the timing information at least by performing one or more timing analyses on the electronic design with the global set of views.

18. The article of manufacture of claim 16, the set of acts further comprising:
identifying a plurality of pins or ports of interest from the electronic design;
determining one or more views respectively associated with the plurality of pins or ports of interest from the global set of views; and
determining timing information for the one or more views respectively associated with the plurality of pins or ports of interest.

19. The article of manufacture of claim 18, the set of acts further comprising:
determining zero or more violating views from the one or more views based in part or in whole upon the timing information;
marking the zero or more violating views in a data structure; and
identifying one or more begin points and one or more end points from the electronic design.

20. The article of manufacture of claim 19, the set of acts further comprising:
determining at least one worst view from the one or more views respectively associated with at least one begin point or end point of the one or more begin points and the one or more end points based in part or in whole upon the timing information; and
marking the at least one worst view in the data structure.

21. The article of manufacture of claim 20, the set of acts further comprising:
propagating the at least one worst view along a timing path in a forward or backward direction; and
identifying one or more propagated worst views for the at least one worst view based in part or in whole upon the timing information associated with the one or more propagated worst views and the at least one worst view.

22. The article of manufacture of claim 20, the set of acts further comprising:
generating a disabled view constraint for the at least one begin point or end point based in part or in whole upon the zero or more violating views, the at least one worst view, and the one or more propagated worst views; and
disabling at least one view from the one or more views associated with the at least one begin point or end point by applying the disabled view constraint.

* * * * *